(12) United States Patent
Rosen (10) Patent No.: US 7,185,825 B1
(45) Date of Patent: Mar. 6, 2007

(54) PROGRAMMABLE THERMOSTAT EMPLOYING A FAIL SAFE REAL TIME CLOCK

(76) Inventor: Howard Rosen, Lyncroft Road, Hampstead, Quebec (CA) H3X 3E3

( * ) Notice: Subject to any disclaimer, the term of this patent is extended or adjusted under 35 U.S.C. 154(b) by 241 days.

(21) Appl. No.: 10/875,579

(22) Filed: Jun. 24, 2004

(51) Int. Cl.
*G05D 23/19* (2006.01)
*G05D 23/32* (2006.01)
*F25B 17/00* (2006.01)
*G05B 15/00* (2006.01)

(52) U.S. Cl. .................. 236/46 C; 236/94; 62/157; 62/231; 700/276

(58) Field of Classification Search .............. 236/94, 236/1 C, 46 R, 46 C; 62/157, 231; 700/275, 700/276
See application file for complete search history.

(56) References Cited

U.S. PATENT DOCUMENTS

| | | | |
|---|---|---|---|
| 4,224,615 A | | 9/1980 | Penz |
| 4,267,966 A | * | 5/1981 | Neel et al. ............... 236/46 A |
| 4,431,134 A | * | 2/1984 | Hendricks et al. ........ 236/46 R |
| 4,818,428 A | | 4/1989 | Scheuble et al. |
| 5,086,385 A | | 2/1992 | Launey et al. |
| 5,170,935 A | | 12/1992 | Federspiel |
| 5,460,327 A | * | 10/1995 | Hill et al. ................ 236/46 R |
| 5,818,428 A | | 10/1998 | Eisenbrandt et al. |
| 6,059,195 A | | 5/2000 | Adams et al. |
| 6,192,282 B1 | | 2/2001 | Smith et al. |
| 6,285,912 B1 | | 9/2001 | Ellison et al. |
| 6,330,806 B1 | | 12/2001 | Beaverson et al. |
| 6,344,861 B1 | | 2/2002 | Naughton |
| 6,478,233 B1 | | 11/2002 | Shah |

(Continued)

FOREIGN PATENT DOCUMENTS

DE    3334117.6    4/1985

(Continued)

OTHER PUBLICATIONS

ADI, "Leopard User Manual," 93 pages, 2001.

(Continued)

*Primary Examiner*—Marc Norman
(74) *Attorney, Agent, or Firm*—Marc E. Hankin; Hankin Patent Law (57) ABSTRACT

A programmable thermostat for controlling space conditioning equipment receives power from the equipment. The thermostat has an interactive interface for user programming, a temperature sensor and a processor including: a central processing unit; a memory for storing program and data information, a real time clock and a non volatile random access memory. A control program stored in the memory causes the real time clock to periodically read its current time and date information into the non-volatile RAM. Upon restart after an outage, the time and date information stored in the non-volatile RAM is read into the real time clock to provide an acceptable time and date basis for resuming operation. Accordingly, the need for providing a backup power source, such as a battery or a supercap, is eliminated. In one exemplary embodiment, the thermostat also includes a receiver for accessing precision time and date signals from, for example, WWVB. The output of the receiver is used to periodically update the time and date in the real time clock such that, even after an outage, the real time clock will be accurate. If the receiver is not operating for some reason after an outage, then the real time clock will still be set from the non-volatile RAM.

16 Claims, 5 Drawing Sheets

U.S. PATENT DOCUMENTS

| | | |
|---|---|---|
| 6,595,430 B1 | 7/2003 | Shah |
| 6,621,507 B1 | 9/2003 | Shah |
| 2003/0040842 A1* | 2/2003 | Poth .......................... 700/275 |
| 2003/0121652 A1* | 7/2003 | Carey et al. ................ 165/238 |

FOREIGN PATENT DOCUMENTS

| | | |
|---|---|---|
| EP | 0985994 | 3/2000 |
| WO | WO 97/11448 | 3/1997 |
| WO | WO 97/39392 | 10/1997 |

OTHER PUBLICATIONS

Business Wire, "MicroTouch Specialty Products Group to Capitalize on Growing Market for Low-Cost Digital Matrix Touchscreens," p1174 (2 pages), Jan. 6, 1999.

DeKoven et al., "Designing Collaboration in Consumer Products," 2 pages, 2001.

Freudenthal et al., "Communicating extensive smart home functionality to users of all ages: the design of a mixed-initiative multimodal thermostat-interface," pp. 34-39, Mar. 12-13, 2001.

Honeywell News Release, "Honeywell's New Sysnet Facilities Integration System For Boiler Plant and Combustion Safety Processes," 4 pages, Dec. 15, 1995.

Honeywell, "W7006A, Home Controller Gateway User Guide," 31 pages, Jul. 2001.

"High-tech options take hold in new homes—200-08-28—Dallas Business Journal," http://biziournals.com!dallas/stories/2000/08/28/focus4, 3 pages, dated Aug. 28, 2000, printed Aug. 19, 2004.

"Product Review—Philips Pronto Remote Control," http://homethreaterhifi.com/volume 6 2/philipsprontoremotecontrol.html, 5 pages, dated May 1999, printed Aug. 20, 2004.

http://www.cc.gatech.edu/computing/classes/cs6751 94 fall/2roupc/climate-2/node 1 .html, "Contents," 53 pages, printed Sep. 20, 2004.

"HAI Company Background," http://www.homeauto.com/AboutHAI/abouthai main.htm, 2 pages, printed Aug. 19, 2004.

Cardio Manual, available at http://www.secant.ca/En/Documentation/Cardio2é-Manual.pdf, Cardio Home Automation Inc., 55 pages, printed Sep. 28. 2004.

"RC X10 Automation Forum: Control your Heating and Cooling System with Pronto(1/1)," http://www.remotecentral.comlcgi-binlmboardlrc-x 1 0/thread.c~i? 12, 2 pages, dated Apr. 23, 1999, printed Aug. 20, 2004.

* cited by examiner

PROGRAMMABLE THERMOSTAT EMPLOYING A FAIL SAFE REAL TIME CLOCK

FIELD OF THE INVENTION

This invention relates to the art of thermostats and, more particularly, to a programmable thermostat incorporating a fail safe real time clock and which does not require battery or other backup device in case of a power failure.

BACKGROUND OF THE INVENTION

Thermostats have been used for many years as temperature sensitive switches which control heating and/or cooling equipment for conditioning a space in which a thermostat, or a temperature sensor connected to the thermostat, is placed. In the well known manner, a simple thermostat can be adjusted to establish a temperature set point such that, when the temperature in the conditioned space reaches the set point, the thermostat interacts with the heating and/or cooling equipment to take suitable action to heat or cool the conditioned space as may be appropriate for the season.

Modern thermostats, which take advantage of the ongoing rapid advances in electronic technology and circuit integration, have many features which provide more precise supervision of the heating and/or cooling equipment to achieve more economical and more comfortable management of the temperature of a conditioned space. Many modern thermostat include a real time clock, a memory and a data processor to run a process control program stored in the memory to accurately measure the temperature of a temperature sensor disposed in the conditioned space and to send control signals to the heating and/or cooling equipment to closely control the temperature of the conditioned space. The use of programmed thermostat systems permits anticipating and minimizing hysterisis or overshoot of the temperature in the conditioned space. In addition, the program can specify different set points at different times of the day and days of the week and may also include a "vacation" mode which employs different set points when the conditioned space is not occupied for an extended period.

Most such modern thermostats are programmable by a user. Typically, a programmable thermostat incorporates a tactile user interface with various buttons (or representations of buttons on a touch screen) to be touched in a precise sequence to program set points (which may vary with the time of day and day of the week) for programmable time periods and which may include both normal and vacation modes. The programming sequence may be followed on a display, typically a liquid crystal display, and when the programming steps have been completed, the thermostat is switched the immediately desired operational mode.

The purpose of a vacation mode is to maintain the temperature of a conditioned space which will be unoccupied for a period at a value which will substantially lower the cost of energy to heat/cool the conditioned space but which ensures that the temperature will not fall into a range at which damage to the premises, for example, freezing pipes, will occur. The operation of programmable thermostats in the vacation mode is straightforward and well known. A separate program from normal operation is entered by whatever procedure is provided in a given thermostat. The vacation mode may include one or more periods a day for which set point temperatures may be entered. In cold climates, a heating temperature set point will be selected by a user to be suitable, say 45° F., such that freezing of water pipes will not take place. If, for example, self sufficient pets are left behind for a few days, a higher temperature, say 60° F., might be selected. The choice is within the purview of the user. Similarly, in hot climates, a user might select a temperature of, say, 90° F. or even higher to effect substantial savings in the cost of energy for cooling, but not so high as to cause damage to items in the space. Again, if, for example, pets are left behind, a more comfortable temperature of 80° F. or so might be selected.

Some programmable thermostats incorporating a vacation mode of operation also provide for storing the date and even time of day that the occupant(s) of the conditioned space will return such that operation of the space conditioning equipment may automatically earlier be returned to a normal mode of operation in anticipation of the return of the occupant(s), thus ensuring a comfortable temperature in the conditioned space at that time.

Most commonly, power to a programmable thermostat is supplied from the controlled space conditioning equipment, and either a battery or very high capacity capacitor ("supercap") provides backup power to "ride out" equipment power failure ("outage") until power is restored. However, these are not fail safe expedients. Batteries must be changed at intervals to ensure that the thermostat will continue to hold its time and setting throughout an outage, but this maintenance task is often ignored or followed sporadically. Supercaps, on the other hand, are susceptible over time to developing leakage which greatly diminish their charge-storing capacity; i.e., they may develop a resistance across their plates which is sufficiently low (even though the resistance value might ordinarily thought to be very high in other circuits) that a charge stored during normal operation discharges to an insufficient level during a power outage before power is restored.

In either instance, the real time clock loses its current time and date values. This state, particularly if the outage occurs while the thermostat is operating in the vacation mode, can have drastic consequences and, at best, can be a significant inconvenience. If, upon the restoration of power, the thermostat enters a programming mode (as if the thermostat were newly installed and because all programming and/or current time and date information has been lost), the normally conditioned space will not be heated or cooled as the case may be such that the reasons set forth above for using the vacation mode will not be met. Even if the thermostat has the capability of restarting in its operational mode at the time of the outage (e.g., if the processor memory includes non-volatile random access memory for storing changeable information such as set up and mode data and can restart the real time clock at, say, some default date), the thermostat real time clock will not have the correct time or date such that, for example, in the vacation mode, the system will not correctly anticipate the return of occupants and thus will not necessarily earlier resume normal operation to render the space comfortable by the time the occupants return.

It will therefor be apparent to those skilled in the art that it would be highly desirable to provide a fail safe real time clock in a programmable clock, particularly a thermostat incorporating a vacation mode of operation.

OBJECTS OF THE INVENTION

It is therefore a broad object of this invention to provide a thermostat which incorporates a fail safe real time clock.

It is another broad object of this invention to provide a thermostat which does not require a backup source of energy for continuing thermostat status during an outage.

It is a more specific object of this invention to provide a thermostat having a real time clock and a non-volatile random access memory in which the current time and date are periodically read from the real time clock into the random access memory such that, in the event of an outage, the last time and date previously stored is recovered from the non-volatile random access memory upon the restoration of power to reset the real time clock in anticipation of resuming operation in the mode running at the time of the outage.

In an alternative and supplementary aspect, it is a more specific object of this invention to also periodically update—and also initialize after an outage—the real time clock by a signal from the National Institute of Standards and Technology or other source of precision time.

SUMMARY OF THE INVENTION

Briefly, these and other objects of the invention are achieved, in a programmable thermostat having a real time clock by periodically, during normal powered operation, storing the current time and date in a non-volatile random access memory such that, in the event of an outage, the last time and date previously stored is recovered from the non-volatile random access memory and used for subsequent operations when power is restored. This provides an acceptable reset of the clock which will only be off current time by an amount represented by the period between the last update and the return of power. The real time clock can subsequently be set to the current time in the usual manner. Thus, the need for backup power, such as a battery or a supercap, is eliminated. In one embodiment, the real time clock is also periodically updated by a signal from the National Institute of Standards and Technology (or other source of precision time). Accordingly, the real time clock is always close to the correct time during normal operation, and when the thermostat is recovering from a power failure, the real time clock will be sufficiently close to effectively permit resumption of normal or vacation mode operation as in the simpler embodiment and will also automatically promptly be set to the correct current time. If the precision time signal is unavailable for some reason, the real time clock will still be reset by the information store in the non-volatile random access memory.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

DESCRIPTION OF THE PREFERRED EMBODIMENT(S)

Figure 1:
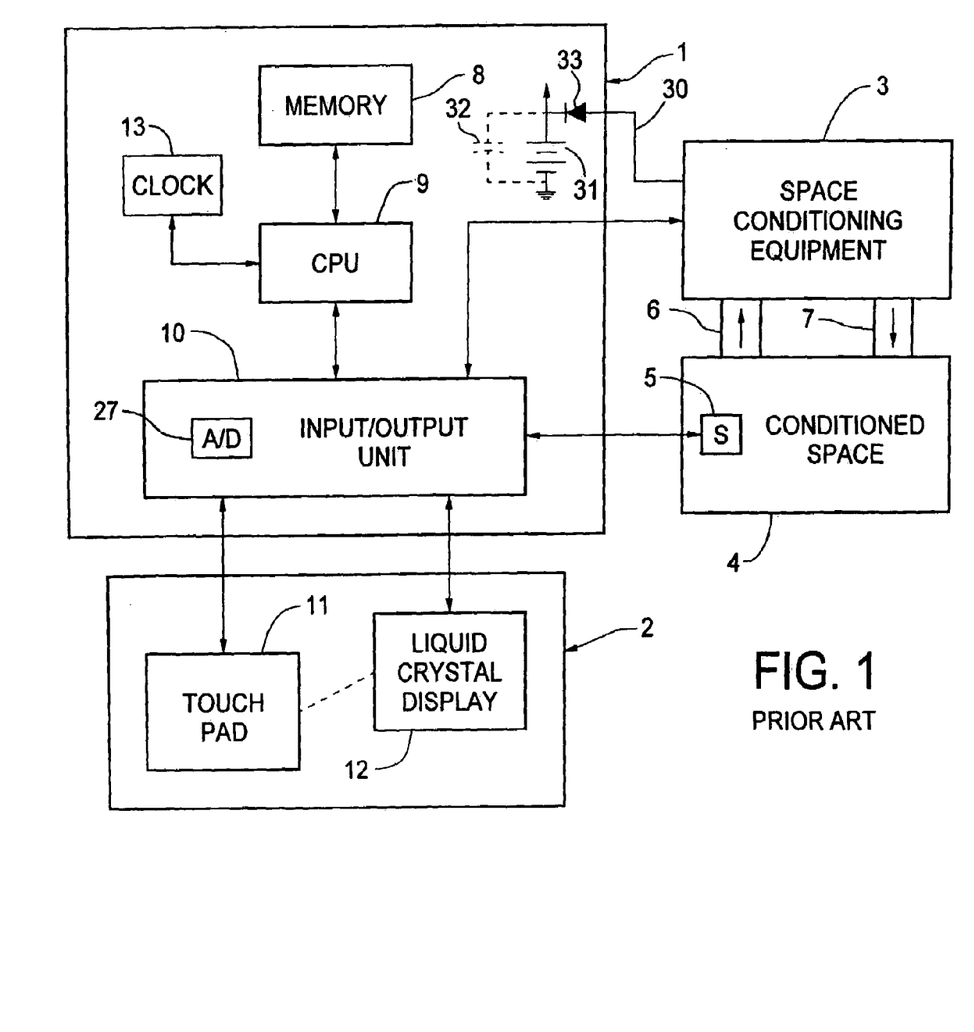
FIG. 1 is a block diagram of an exemplary space conditioning system incorporating a thermostat with backup power, in case of an outage, supplied from a battery or supercap in accordance with the prior art.

Referring first to FIG. 1, an exemplary thermostat includes a processor 1, a touch screen 2 and a temperature sensor 5 which is disposed in a conditioned space 4. It will be understood that the processor 1 and the touch screen 2 are typically situated in a common housing (not shown). The sensor 5 may also be situated in the common housing or remotely as shown, all as very well known in the art. The common housing is usually, but not necessarily, placed in the conditioned space 4. Thus, those skilled in the art will understand that the block diagram of FIG. 1 is very general in order to best explain an exemplary environment in which the invention can be practiced as will be discussed below.

The processor 1 includes a central processing unit (CPU) 9 in communication with a memory 8 for storing data and program information and also, via an input/output unit (I/O unit) 10, a touch pad 11 and a liquid crystal display (LCD) 12 which constitute the touch screen 2. The memory 8 may include a read-only part which is factory-programmed and a random-access part which stores data subject to change during operation. A settable real time clock 13 is used to keep time in the thermostat to facilitate diverse operations, such as different temperature set points (desired temperatures), during different periods of the day cycle. An analog-to-digital converter 27 (which may not be required in all systems) serves to convert any analog information received by the I/O unit 10 to digital information which is suitable for use by the CPU 9.

Temperature information from the sensor 5 and output signals to a space conditioning (heating and/or cooling) unit 3 pass through the I/O unit 10 under control of the CPU 9. Those skilled in the art will understand that if the correspondents external to the processor 1 communicating with the CPU 9 are all digital in nature (e.g., if the temperature sensor 5 incorporates its own analog-to-digital converter and sends a digital representation of temperature to the processor 1), then the I/O unit 10 may only constitute simple switching circuits.

Thus, in the usual manner during normal operation, the temperature sensor 5 sends an electrical signal (e.g., if the sensor 5 is a simple thermistor, a resistance value; several types of temperature sensors are widely used) representative of the temperature within the conditioned space 4 which the processor can compare against a previously entered set point to determine if control signals need to be sent to the space conditioning equipment 3. For example, if the temperature in the conditioned space 4 is found to be too low when operation is in the heating mode, the processor 1 signals the space conditioning equipment 3 to circulate, through ducts 6, 7, air from/to the conditioned space 4 which is heated by the space conditioning equipment before return to the conditioned space. This heating phase continues until the sensor 5 indicates that the space is now too hot (or approaching too hot) with reference to the current set point such that the processor 1 sends signal(s) to the space conditioning equipment 3 to cease the heating function, all as very well known in the art. In a cooling mode, a counterpart procedure is followed. Those skilled in the art will understand that the control process typically includes such refinements as anticipation, hysterisis accommodation, fan control, etc. which are acknowledged, but are not directly relevant to the invention.

In accordance with the prior art, power to the processor 1 is conventionally supplied from the space conditioning equipment 3 via a line 30 through an isolation diode 33. In the event of a power outage, power is supplied from a backup battery 31 (or a very high capacity capacitor "supercap" 32) to "ride out" equipment power failure until power is restored. However, these are not fail safe expedients. Batteries must be changed at intervals (and often are not) to ensure that the thermostat (or at least the clock) will continue to operate during a power failure. Supercaps are susceptible to developing leakage which greatly diminish their charge-storing capacity; i.e., they may develop a resistance across the plates sufficiently low that a charge stored during normal operation discharges during an outage before power is restored.

Figure 2:
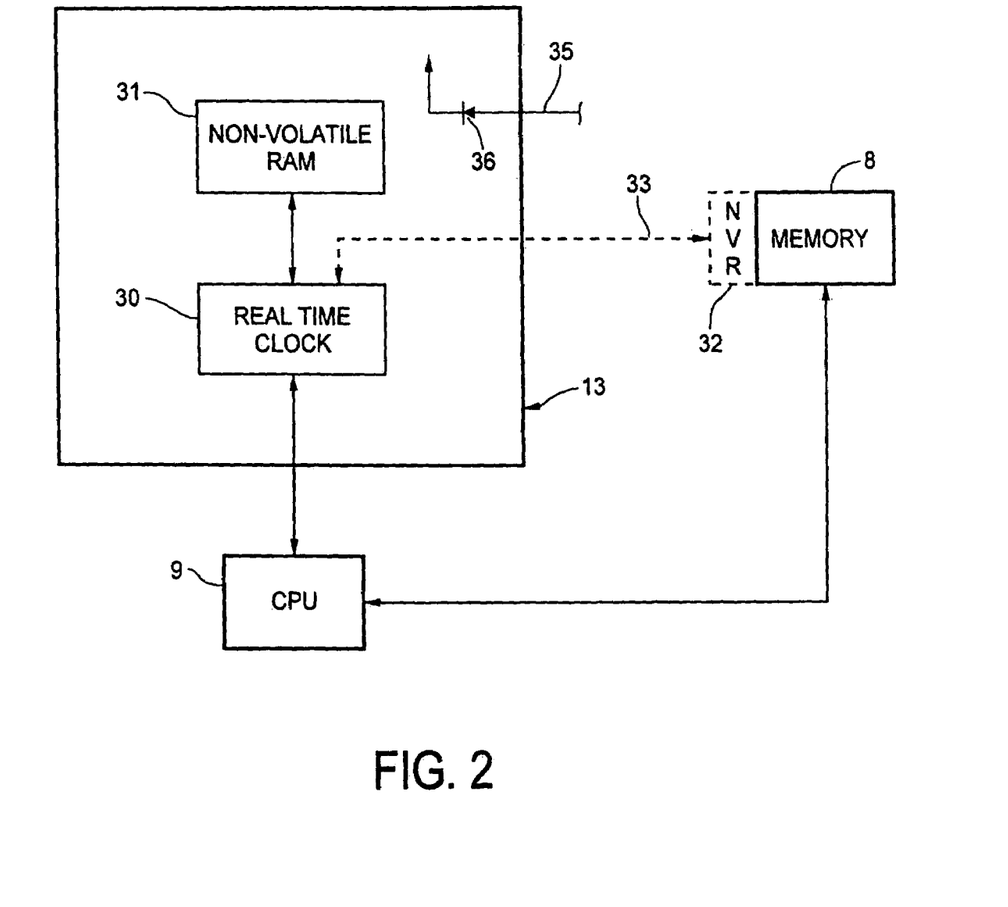
FIG. 2 is a block diagram of a portion of the processor component of the thermostat particularly showing aspects of the thermostat clock and its support circuitry in a first exemplary embodiment of the invention.

Attention is now directed to FIG. 2 which is a block diagram of the clock 13, modified according to a first exemplary embodiment of the invention, and the components with which it communicates. As previously described, the clock 13 provides real time information to the CPU 9 to facilitate the timely institution of or stopping of diverse operations. The clock 13, in accordance with the present invention includes a real time clock module 30 which is an off-the-shelf integrated circuit component and a small non-volatile random access memory (RAM) 31, such as a flash RAM or electrically eraseable random access memory (eeprom). Such memories, of which there are various types, are characterized in that they will hold their contents indefinitely upon a power failure, but may, during normal operation, be rewritten essentially limitlessly in the same manner as a volatile RAM which, however, does lose its contents as a result of a power loss. It may be noted, as represented by the dashed communication line 33, that, in practicing the invention, the memory 8 may include a non-volatile RAM section 32 which eliminates the need for the separate non-volatile RAM 33. As a practical matter, as the state of the art of circuit integration progresses, most or all the components of a programmable thermostat according to the invention may be incorporated as a single configurable and programmable integrated circuit or in a very few chips.

The thermostat, including the real time clock 30, is normally conventionally powered, via line 35 and an isolation diode 36, from the equipment to which the thermostat is connected. However, it is a feature of the invention that no source of backup power, such as a battery or supercap, is required.

Figure 3:
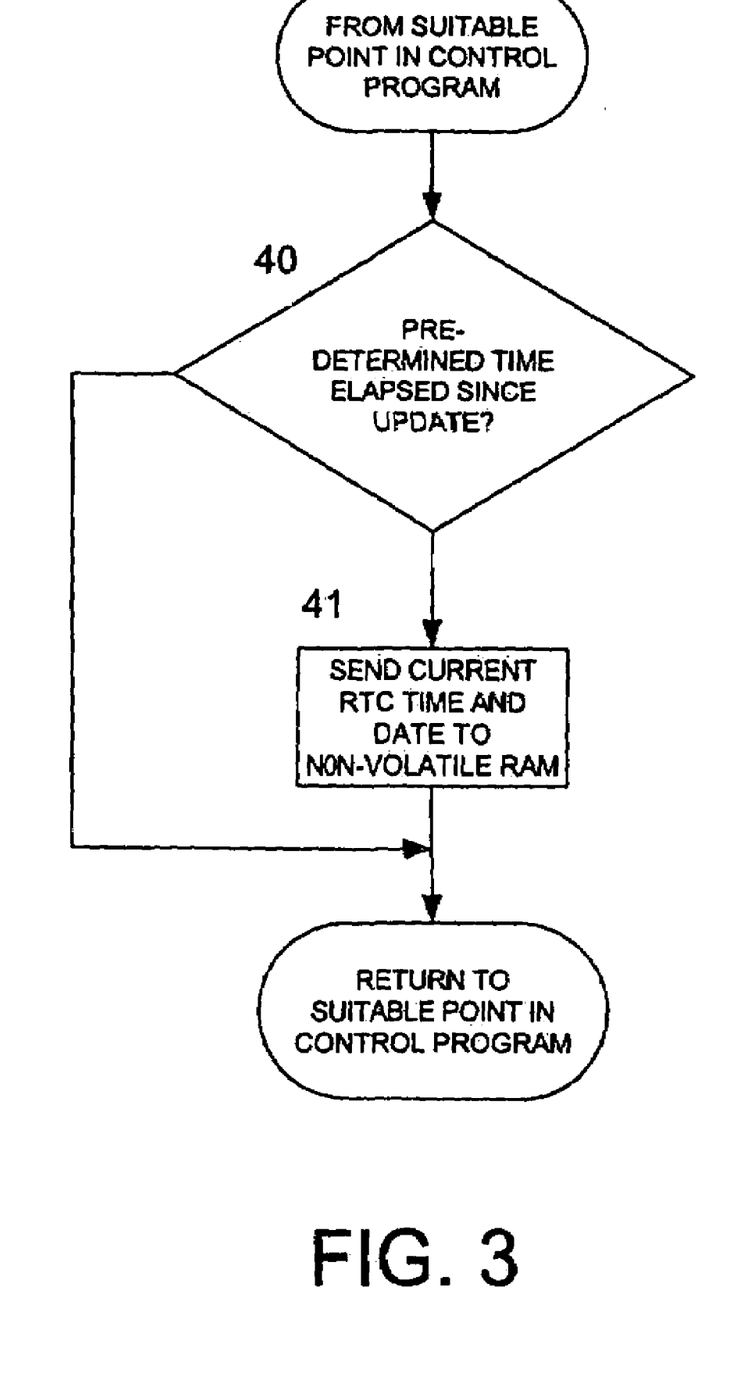
FIG. 3 is a process flow chart illustrating a part of the thermostat control program by which an updating operation is carried out according to the practice of the invention.

Referring also now to the process flow chart of FIG. 3, the relevant portion of the control program normally running in the CPU 9 is described. In accordance with the invention, at some suitable point in the loop of the control program, an inquiry is made (step 40) as to whether a predetermined period since the time and date information in the real time clock 30 were last stored has been exceeded. (Merely by way of example, the predetermined period might be one hour, but it could be as often as every time the control program runs through the routine shown in FIG. 3 which would eliminate the need for step 40.) If not, the control program continues. However, if the predetermined period has been exceeded, the stored time and date is updated (step 41) from the real time clock before continuing the control program.

Figure 4:
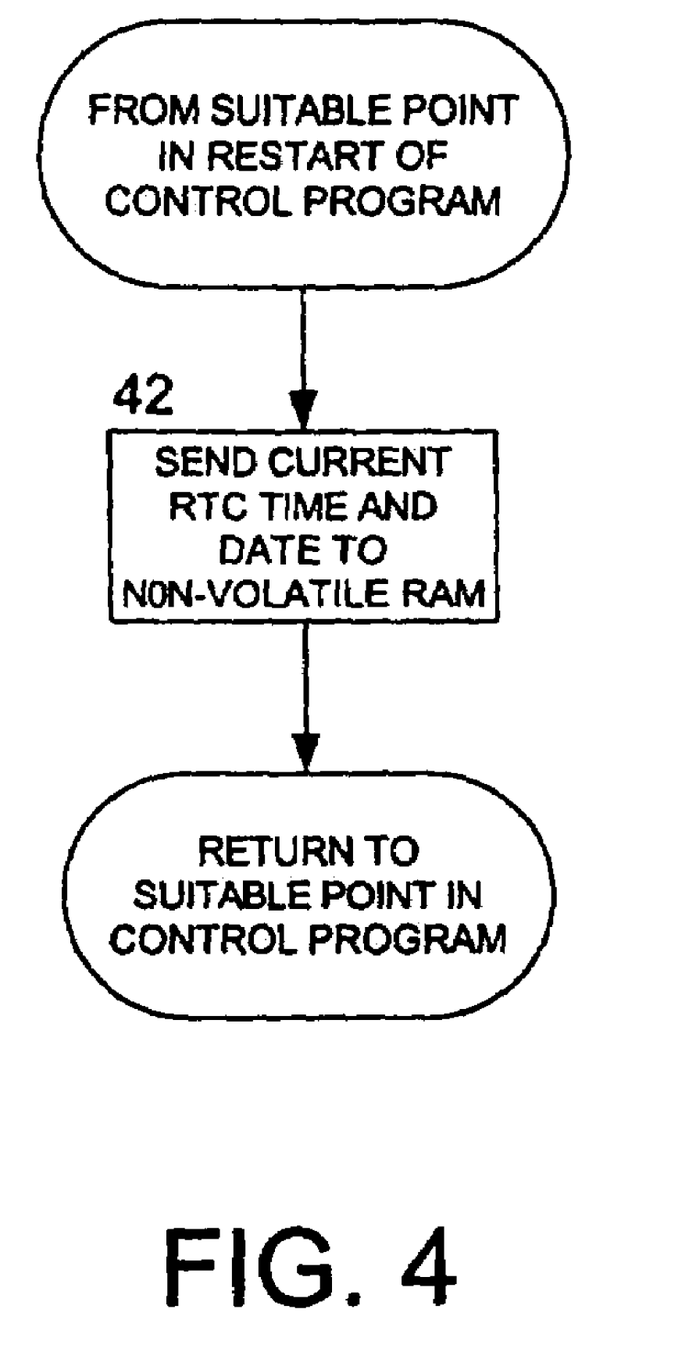
FIG. 4 is a process flow chart showing a part of the control program restart when power has just been restored after an outage according to the invention.

Referring now to FIG. 4, it will be seen that, in the event of a power failure and then a restart after power has been restored, the restart procedure of the control program includes resetting the real time clock from the time and date value stored in the non-volatile RAM 31. Accordingly, the time and date will be off no more than the period of the outage plus the period since the time and date were last updated before the outage as described above. Most outages are relatively short term, a few minutes to perhaps an hour, such that it will be apparent that a restart with a time and date resident in the real time clock which is only this limited amount slow will permit resumption of operation with little problem. As previously mentioned, this is of particular importance when the thermostat is operating in the vacation mode.

Figure 5:
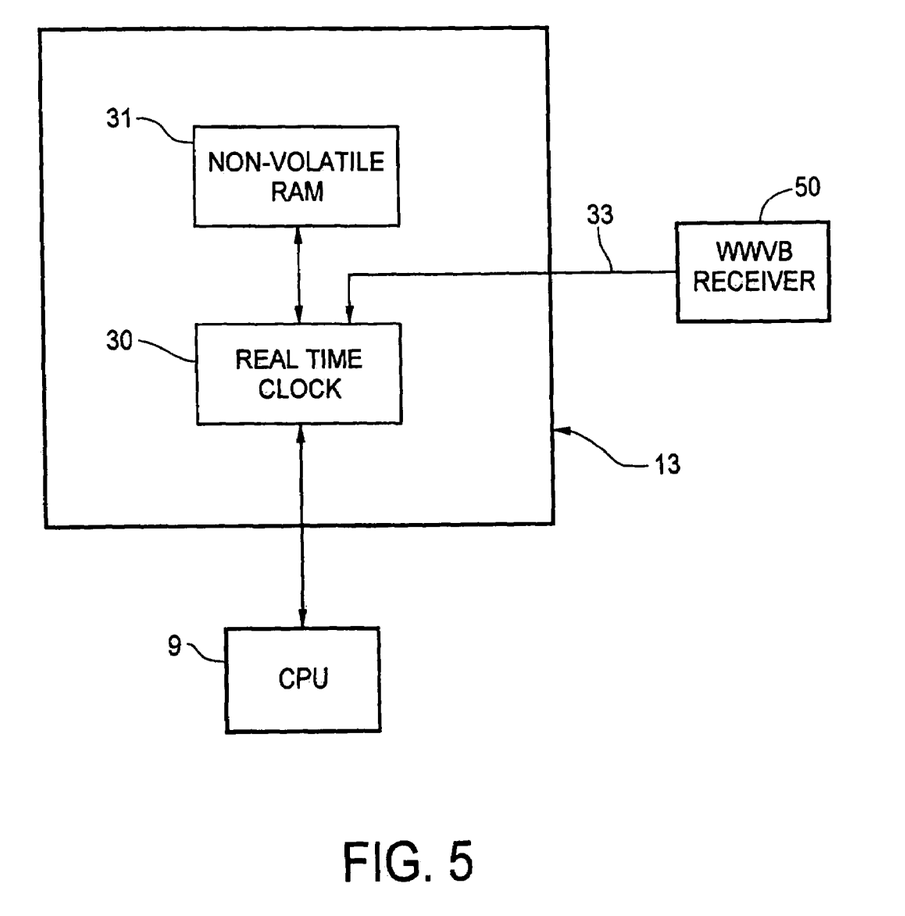
FIG. 5 is a block diagram of a portion of the processor component of the thermostat particularly showing aspects of the real time clock and its support circuitry in a second exemplary embodiment of the invention

FIG. 5 illustrates a second exemplary embodiment of the invention. In this embodiment, a wireless receiver 50 is tuned to a source of precision time such as WWVB which operates at 60 khz. Such receivers are well known in the art and may be implemented in small integrated circuits which can readily be incorporated into a thermostat. For example, a single chip WWVB receiver is available from Micro Analog Systems of Espoo, Finland, and is designated by part number MAS9178 in data sheet DA9178.000. The output from the receiver 50 is a once per second data set of the exact time (which can be adjusted to a time zone) and date. This information is used to periodically update the time and date information running in the real time clock 30.

It will now be understood that the embodiment of the invention shown in FIG. 5 will normally keep, and resume after an outage, precision time from a suitable source such as WWVB. In addition, if WWVB is not being received (because it is off the air, there is interference, etc.), then the clock is still fail safe because this embodiment will then operate in the manner of the embodiment shown in FIG. 2 and the process flow charts of FIGS. 3 and 4.

While a wireless source of precision time has been discussed, it should be noted that precision time (from, for example, the National Institute of Standards and Technology) is also available on the Internet such that it is contemplated that the source 50 can receive its time signals via that medium.

In another embodiment of the invention, for use in areas where the wireless reception of time and date signals is reliable (or when the Internet, now very reliable, is used as the communications medium), then the non-volatile RAM 31 may be omitted and the sub-processes shown in FIGS. 3 and 4 need not be carried out. Rather, the real time clock 30 will be constantly (or as often as desired) updated from the external precision time source and, in the event of an outage and restart, the real time clock 30 will be promptly accurately set.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. A programmable thermostat for controlling space conditioning equipment comprising:
   A) means coupling suitable power for energizing said thermostat from said space conditioning equipment to said thermostat;
   B) an interactive interface for a user to enter programming information into said thermostat;
   C) a temperature sensor for providing an electrical signal indicative of the temperature of a conditioned space in which the temperature sensor is situated;

D) a processor, said processor including:
   1) a central processing unit;
   2) a first memory coupled to said central processing unit for storing program and data information; and
   3) an input/output unit including:
      a) a sensor input coupled to said temperature sensor for receiving said electrical signal therefrom; and
      b) a control output coupled to the space conditioning equipment for issuing control signals thereto;
   4) a real time clock;
   5) a non-volatile random access memory; and
   6) a control program stored in said first memory directing:
      a) said real time clock to periodically read its current time and date information into said non-volatile memory; and
      b) upon restart after a loss and then return of power from said space conditioning equipment, read the time and date information stored in said non-volatile memory into said real time clock.

2. The thermostat of claim 1 in which said non-volatile random access memory is included in said first memory.

3. The thermostat of claim 2 which includes a vacation mode of operation.

4. The thermostat of claim 1 which includes a vacation mode of operation.

5. The thermostat of claim 1 which further includes a receiver adapted to receive current time and date information from an external source of the current time and date, said receiver being coupled to said real time clock such that the time and date information thereof is updated from said receiver.

6. The thermostat of claim 5 in which said receiver receives wireless signals from said external source.

7. The thermostat of claim 6 which includes a vacation mode of operation.

8. The thermostat of claim 5 in which said receiver receives signals via the Internet from said external source.

9. The thermostat of claim 8 which includes a vacation mode of operation.

10. The thermostat of claim 5 which includes a vacation mode of operation.

11. A programmable thermostat for controlling space conditioning equipment comprising:
   A) means coupling suitable power for energizing said thermostat from said space conditioning equipment to said thermostat;
   B) an interactive interface for a user to enter programming information into said thermostat;
   C) a temperature sensor for providing an electrical signal indicative of the temperature of a conditioned space in which the temperature sensor is situated;
   D) a processor, said processor including:
      1) a central processing unit;
      2) a first memory coupled to said central processing unit for storing program and data information; and
      3) an input/output unit including:
         a) a sensor input coupled to said temperature sensor for receiving said electrical signal therefrom; and
         b) a control output coupled to the space conditioning equipment for issuing control signals thereto;
      4) a real time clock; and
      5) a receiver adapted to receive current time and date information from an external source of the current time and date, said receiver being coupled to said real time clock such that the time and date information thereof is updated from said receiver.

12. The thermostat of claim 11 in which said receiver receives wireless signals from said external source.

13. The thermostat of claim 12 which includes a vacation mode of operation.

14. The thermostat of claim 11 in which said receiver receives signals via the Internet from said external source.

15. The thermostat of claim 14 which includes a vacation mode of operation.

16. The thermostat of claim 11 which includes a vacation mode of operation.

* * * * *